United States Patent
Koba et al.

(10) Patent No.: US 7,898,951 B2
(45) Date of Patent: Mar. 1, 2011

(54) ENCODING AND TRANSMITTING VARIABLE BIT STREAMS WITH UTILIZATION OF A CONSTRAINED BIT-RATE CHANNEL

(75) Inventors: Igor M. Koba, Savannah, GA (US); Mikhail Chernomordik, Savannah, GA (US)

(73) Assignee: Jones Farm Technology 2, LLC, Wilmington, DE (US)

( * ) Notice: Subject to any disclaimer, the term of this patent is extended or adjusted under 35 U.S.C. 154(b) by 1090 days.

(21) Appl. No.: 10/913,864

(22) Filed: Aug. 6, 2004

(65) Prior Publication Data

US 2005/0036550 A1    Feb. 17, 2005

Related U.S. Application Data

(60) Provisional application No. 60/494,945, filed on Aug. 13, 2003.

(51) Int. Cl.
*H04J 3/16* (2006.01)
*H04N 7/58* (2006.01)
*H04J 3/18* (2006.01)

(52) U.S. Cl. ............... 370/232; 375/240.26; 375/240.28
(58) Field of Classification Search ............. 375/240.26; 370/465, 535, 537, 538; 348/385.1
See application file for complete search history.

(56) References Cited

U.S. PATENT DOCUMENTS

| | | | |
|---|---|---|---|
| 5,513,181 A * | 4/1996 | Bresalier et al. | ............... 370/465 |
| 5,854,658 A | 12/1998 | Uz et al. | |
| 6,044,396 A | 3/2000 | Adams | |
| 6,181,711 B1 * | 1/2001 | Zhang et al. | ................... 370/468 |
| 6,192,083 B1 | 2/2001 | Linzer et al. | |
| 6,195,388 B1 | 2/2001 | Choi et al. | |
| 6,259,733 B1 | 7/2001 | Kaye et al. | |
| 6,275,536 B1 * | 8/2001 | Chen et al. | ............... 375/240.25 |
| 6,377,624 B1 * | 4/2002 | Keesman | ................. 375/240.03 |
| 6,407,680 B1 * | 6/2002 | Lai et al. | ......................... 341/50 |
| 6,434,197 B1 * | 8/2002 | Wang et al. | .............. 375/240.29 |

(Continued)

FOREIGN PATENT DOCUMENTS

EP    798924 A2 *    10/1997

OTHER PUBLICATIONS

Nagayoshi, I. et al. "Transcoder System With High Processing Efficiency to Support Simultaneous Multirate Output", IEEE International Conference on Visual Information Engineering 2003 (VIE 2003), Jul. 1993, pp. 250-253.*

(Continued)

*Primary Examiner* — Mehrdad Dastouri
*Assistant Examiner* — David N Werner
(74) *Attorney, Agent, or Firm* — Stolowitz Ford Cowger LLP (57) ABSTRACT

Systems and methods are provided in which video information streams are encoded and transmitted with optimal utilization of constrained bit-rate channel. In accordance with one embodiment, among others, a system is provided, which includes synchronous multi-channel encoder (SMEs), a system multiplex controller (SMC), switches, and a multiplexer. In combination, these components receive an input video signal, and produce encoded video bit streams from the received input video signal. Each encoded video bit stream is substantially identical to other encoded video bit streams, but each encoded video bit stream has a different bit rate than the other encoded video bit streams. An optimal encoded video bit stream is determined from the encoded video bit streams. That optimal encoded video bit stream is selected, multiplexed, and than delivered to the output.

23 Claims, 5 Drawing Sheets

| INDEX NUMBER OF VIDEO CHANNEL | SWITCH POSITION 1 BIT-RATE = 3.0 Mb/s | | SWITCH POSITION 2 BIT-RATE = 3.5 Mb/s | | SWITCH POSITION 3 BIT-RATE = 2.5 Mb/s | |
|---|---|---|---|---|---|---|
| | AVERAGE QUANTIZATION | PSNR | AVERAGE QUANTIZATION | PSNR | AVERAGE QUANTIZATION | PSNR |
| VIDEO CHANNEL 1 | 8.0 | 30.5 | 7.0 | 32.1 | 9.0 | 29.2 |
| VIDEO CHANNEL 2 | 8.5 | 29.7 | 7.8 | 30.6 | 9.3 | 29.0 |
| VIDEO CHANNEL 3 | 9.2 | 31.0 | 8.4 | 32.8 | 9.7 | 30.4 |
| VIDEO CHANNEL 4 | 8.7 | 31.2 | 7.7 | 33.0 | 9.4 | 30.5 |
| VIDEO CHANNEL 5 | 7.2 | 31.4 | 6.5 | 33.3 | 8.6 | 30.8 |

U.S. PATENT DOCUMENTS

| | | | |
|---|---|---|---|
| 6,456,591 B1 * | 9/2002 | Mishra | 370/229 |
| 6,490,320 B1 * | 12/2002 | Vetro et al. | 375/240.08 |
| 6,542,546 B1 * | 4/2003 | Vetro et al. | 375/240.12 |
| 6,789,123 B2 * | 9/2004 | Li et al. | 709/231 |
| 6,904,094 B1 | 6/2005 | Liu et al. | |
| 7,039,115 B1 | 5/2006 | Wu | |
| 2002/0094025 A1 * | 7/2002 | Hanamura et al. | 375/240.01 |
| 2002/0152317 A1 * | 10/2002 | Wang et al. | 709/231 |
| 2003/0012275 A1 * | 1/2003 | Boice et al. | 375/240.01 |

OTHER PUBLICATIONS

Boroczky et al., "Statistical Multiplexing Using MPEG-2 Video Encoders", IBM Journal of Research and Deveolopment, vol. 43, N. 4, Jul. 1999.

Mike Knee; "MPEG Video"; Snell & Wilcox; Mar. 2002; pp. 1-20.

http://www.bretl.com/mpeghtml/codecdia1.HTM; "MPEG Coder/Decoder Diagram"; Mar. 30, 2002; pp. 1-2.

* cited by examiner

FIG. 1 (Background)

| INDEX NUMBER OF VIDEO CHANNEL | SWITCH POSITION 1 BIT-RATE = 3.0 Mb/s | | SWITCH POSITION 2 BIT-RATE = 3.5 Mb/s | | SWITCH POSITION 3 BIT-RATE = 2.5 Mb/s | |
|---|---|---|---|---|---|---|
| | AVERAGE QUANTIZATION | PSNR | AVERAGE QUANTIZATION | PSNR | AVERAGE QUANTIZATION | PSNR |
| VIDEO CHANNEL 1 | 8.0 | 30.5 | 7.0 | 32.1 | 9.0 | 29.2 |
| VIDEO CHANNEL 2 | 8.5 | 29.7 | 7.8 | 30.6 | 9.3 | 29.0 |
| VIDEO CHANNEL 3 | 9.2 | 31.0 | 8.4 | 32.8 | 9.7 | 30.4 |
| VIDEO CHANNEL 4 | 8.7 | 31.2 | 7.7 | 33.0 | 9.4 | 30.5 |
| VIDEO CHANNEL 5 | 7.2 | 31.4 | 6.5 | 33.3 | 8.6 | 30.8 |

FIG. 5

ENCODING AND TRANSMITTING VARIABLE BIT STREAMS WITH UTILIZATION OF A CONSTRAINED BIT-RATE CHANNEL

CROSS REFERENCE TO RELATED APPLICATIONS

This application claims the benefit of U.S. provisional patent application Ser. No. 60/494,945, filed Aug. 13, 2003, which is incorporated herein by reference in its entirety.

FIELD OF THE INVENTION

The present invention relates generally to encoding and transmitting variable bit streams and, more particularly, to encoding and transmitting variable bit streams with utilization of a constrained bit-rate channel.

BACKGROUND

Typical video encoding systems utilize various multiplexing techniques to transmit a plurality of compressed video bit streams (VBS) over a single channel. Generally, without special improvements, these channels have limited ability to transfer digital data streams. For example, a conventional channel may have an upper transfer boundary of approximately 10 megabits/sec. These channels are often referred to as "constrained bit-rate channels." The bit-rate of an encoded stream (e.g., a stream that is encoded with MPEG-2) may fluctuate with time because input video frames have different complexity, and video fragments have various dynamic properties.

An example of a system multiplexer is described in Barry G. Haskell, Atul Puri, and Arun N. Netravali, "Digital Video: An Introduction To MPEG-2," Chapman & Hall, 1997 (hereinafter referred to as "the Haskell reference"). The Haskell reference describes encoders, a multiplexer switch and buffer, and a system multiplex controller. Techniques used to combine a number of compressed, fluctuating video bit-streams into a constrained bit-rate channel are called statistical multiplexing. The purpose of statistical multiplexing is to dynamically distribute the available channel bandwidth among various video programs. Statistical multiplexing is described in U.S. Pat. No. 6,044,396 (hereinafter "the '396 patent"), entitled "Method And Apparatus For Utilizing The Available Bit-rate In A Constrained Variable Bit-rate Channel," filed by Michael B. Adams, which is incorporated herein by reference as if set forth in its entirety. Hence, further discussion of statistical mutliplexing is omitted here.

Figure 1:
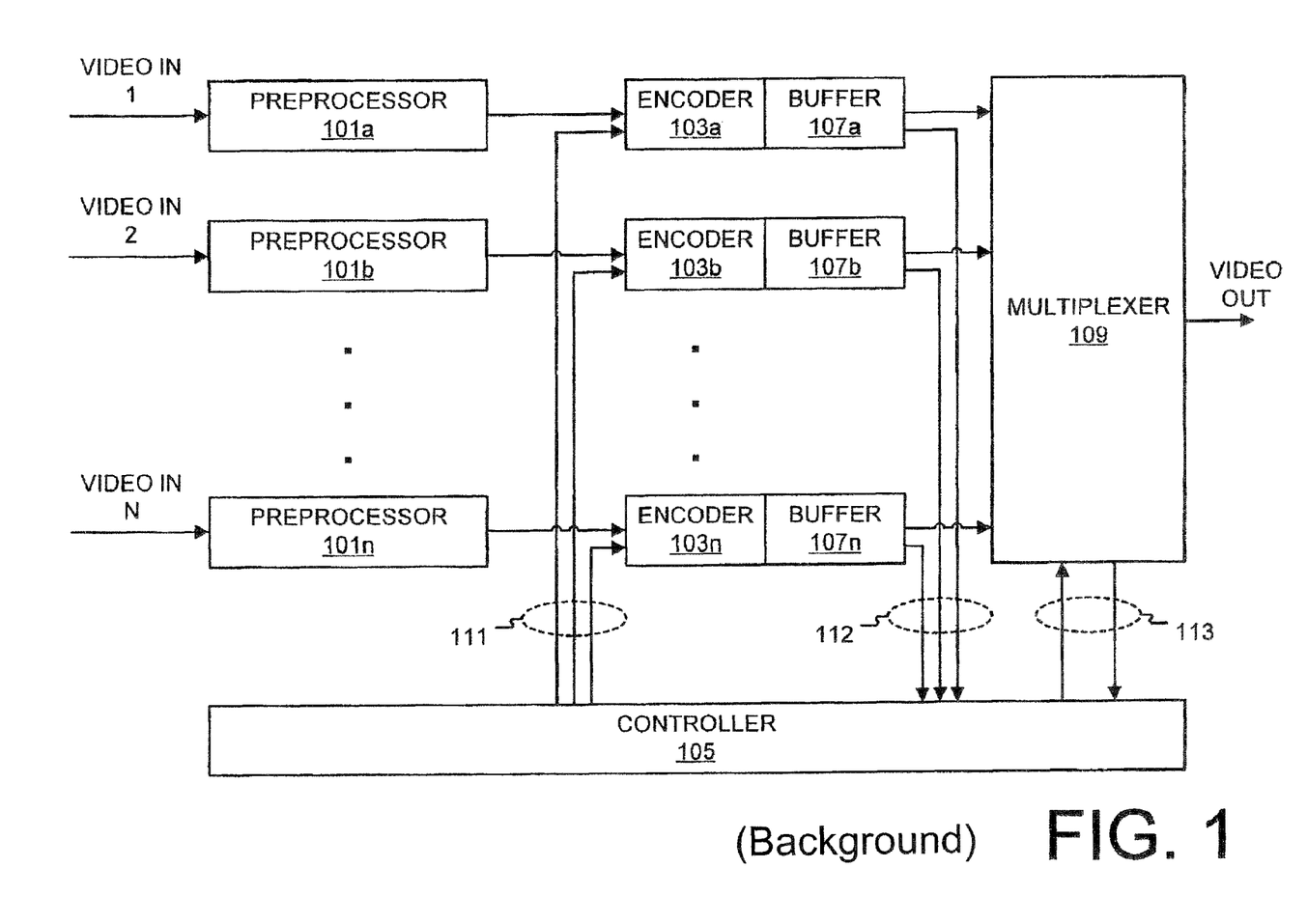
FIG. 1 is a block diagram showing a typical video multiplexer of the prior art.

FIG. 1 shows a conventional multiplexing system for compressing and combining video streams using MPEG encoding standards. Usually the conventional multiplexing system includes preprocessors 101a . . . 101n (collectively referred to as "preprocessors 101"), encoders 103a . . . 103n (collectively referred to as "encoders 103"), a controller 105, and a multiplexer 109. The preprocessors 101 perform spatial and/or temporal filtering. The preprocessors 101 also perform luminance-, chrominance-, and format transformations. Additionally, the preprocessors 101 collect statistical data in accordance with known methods. The encoders 103 comprise buffers for temporal storing of coded data. The encoders 103 utilize a virtual buffer model, which is known in the art, for data rate control. This ensures that data can be transmitted to the receiver and decoded without interruption. The controller 105 supervises the encoders 103 and the multiplexer 109. Often, the architecture of FIG. 1 is tasked for digital processing of large volumes of data, which are characteristic of video compression. However, the single-input-single-output (SISO) architecture of the encoders 103 of FIG. 1 limits the data capacity of the multiplexing system, thereby resulting in limited processing efficiency.

U.S. Pat. No. 6,192,083 (hereinafter "the '083 patent"), entitled "Statistical Multiplexed Video Encoding Using Pre-Encoding A Priori and A Posteriori Statistics," gives one approach for overcoming problems with conventional statistical multiplexing systems. In the '083 patent, the controller typically makes bit allocation decisions using only a posteriori statistics when the pictures of the N video streams have already been encoded. This results in periods of poor quality video for some video streams. Hence, the approach of the '083 patent is generally useful for non-real-time encoding. The '083 patent teaches the steps of pre-encoding video, storing the pre-encoded MPEG video and statistical files, transcoding the pre-encoded video, and using a priori and a posteriori statistics for bit allocation. That approach, therefore, improves video quality during demultiplexing and decoding of multiplexed bit streams. However that approach is very complicated, memory-intensive, and not readily amenable to real-time encoding and/or multiplexing.

L. Boroczky, A. Y. Ngai, and E. F. Westermann, in the article "Statistical multiplexing using MPEG-2 video encoders," (hereinafter "the IBM article") IBM Journal of Research and Development, Vol. 43, N. 4, 1999, and Choi et al. in U.S. Pat. No. 6,195,388 (hereinafter "the '388 patent"), entitled "Apparatus And Method For Encoding Multiple Video Programs," propose systems that use joint rate-control algorithms to dynamically allocate constrained channel bandwidths among encoders. Those systems have typical structures for statistical multiplexing, but are based on the improved controller strategy. Those systems were intended for real time data encoding and transmission. However, those systems have very limited opportunity of control, since they use algorithms that unreliably forecast the complexity of the video frames.

U.S. Pat. No. 5,854,658 (hereinafter "the '658 patent"), entitled "Statistical Multiplexing System Which Encodes a Sequence of Video Images Using a Plurality of Video Encoders," describes approaches where each video frame is encoded by one master encoder and multiple slave encoders that share frame and buffer memory. The '658 patent provides algorithms for constant bit-rate (CBR) encoding and variable bit-rate (VBR) encoding. However, the '658 patent does not correspond to real-time multiplexing systems because the algorithm has recursive properties.

U.S. Pat. No. 6,259,733 (hereinafter "the '733 patent"), entitled "Pre-Processing Of Bit-rate Allocation In A Multi-Channel Video Encoder," suffers from similar recursive properties. However, unlike the '658 patent, the '733 patent uses preprocessing for better bit allocation.

Other shortcomings exist in known multi-channel real-time encoding and multiplexing systems. For example, a feedback loop for bit allocation correction introduces unacceptable delay and does not readily permit resolving of critical conditions. Additionally, there may be excessive variation in the quality of the resulting video programs, often resulting in problems such as video degradation. Also, overflow problems may occur due to the finite-volume output buffer of the system. Moreover, the admitted bandwidth of the multiplexed channel may not be efficiently used.

In view of the aforementioned deficiencies, a need exists in the industry for a more efficient and flexible approach to encoding and transmitting multiple video data streams through constrained rate transmission channels.

SUMMARY

Systems and methods are provided in which video information streams are encoded and transmitted with optimal utilization of a constrained bit-rate channel.

In accordance with one embodiment, among others, a system is provided, which includes synchronous multi-channel encoder (SMEs), a system multiplex controller (SMC), switches, and a multiplexer.

Each SME being configured to receive an input video signal, and substantially simultaneously produce encoded video bit streams from the input video signal. Each encoded video bit stream from a particular SME is substantially identical to other encoded video bit streams from the same SME. Also, each encoded video bit stream from a particular SME has a different bit rate than the other encoded video bit streams from the same SME.

The SMC is configured to receive parameters of encoded video bit streams from each SME, determine an optimal encoded signal for each SME, and generate switch control signals. Each switch control signal corresponds to one of the SMEs, and is indicative of the optimal encoded video bit stream for its corresponding SME. The SMC is further configured to generate a multiplexer control signal.

Each switch is coupled to a corresponding SME. Each switch is configured to receive the encoded video bit streams from its corresponding SME, receive a corresponding switch control signal from the SMC, select an optimal encoded video bit stream as a function of its corresponding switch control signal, and output the optimal encoded video bit stream.

The multiplexer is coupled to the switches and, also, to the SMC. The multiplexer is configured to receive the optimal encoded video bit streams from each switch, receive encoded audio bit stream, receive the multiplexer control signal from the SMC, generate a multiplexed output stream from the optimal encoded video bit streams, and output the multiplexed output stream.

In accordance with another embodiment, among others, a method is provided. One embodiment, among others, of the method, begins by receiving an input video signal. Encoded video bit streams are produced from the received input video signal. Each encoded video bit stream is substantially identical to other encoded video bit streams, but each encoded video bit stream has a different bit rate than the other encoded video bit streams. An optimal encoded video bit stream is determined from the encoded video bit streams. That optimal encoded video bit stream is selected and output.

Other systems, devices, methods, features, and advantages will be or become apparent to one with skill in the art upon examination of the following drawings and detailed description. It is intended that all such additional systems, devices, methods, features, and advantages be included within this description, be within the scope of the present invention, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE INVENTION

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

For purposes of clarity, the descriptions below reference the motion pictures expert group (MPEG) standard, which is known in the art. Hence, unless otherwise indicated, terminology that is consonant with the MPEG standard is used to describe the several embodiments. While MPEG nomenclature is used throughout to clearly describe various embodiments, the invention is not intended to be limited to MPEG.

Figure 2:
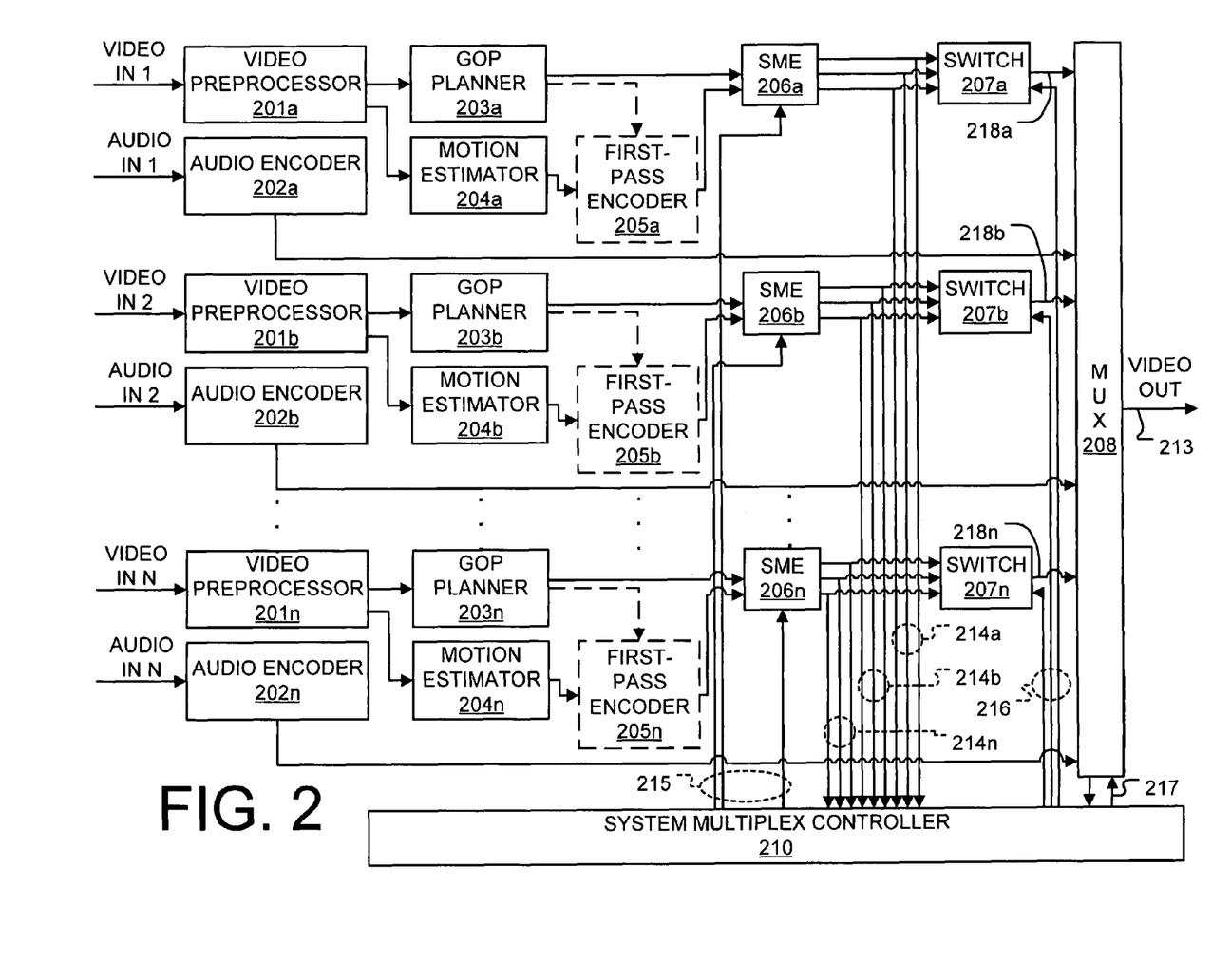
FIG. 2 is a block diagram showing an embodiment of a multiplexing system with synchronous multi-channel encoders (SMEs).

FIG. 2 is a block diagram showing an embodiment of a multiplexing system 200 with synchronous multi-channel encoders (SMEs). In the embodiment of FIG. 2, the multiplexing system 200 includes video preprocessors 201a . . . 201n (collectively referred to as "video preprocessors 201"), audio encoders 202a . . . 202n (collectively referred to as "audio encoders 202"), group of pictures (GOP) planners 203a . . . 203n (collectively referred to as "GOP planners 203"), motion estimators (MEs) 204a . . . 204n (collectively referred to as "MEs 204"), first pass encoders 205a . . . 205n (collectively referred to as "first pass encoders 205"), SMEs 206a . . . 206n (collectively referred to as "SMEs 206"), switches 207a . . . 207n (collectively referred to as "switches 207"), a system multiplex controller (SMC) 210, and a multiplexer (MUX) 208 with a buffer 209.

As shown in FIG. 2, the audio encoders 202 receive audio input signals 212 from their corresponding audio sources (not shown) and perform audio compression on the audio input signals 212. Once compressed, the filtered audio signals are conveyed to the MUX 208.

Each of the video preprocessors 201 is coupled to a corresponding GOP planner 203 and a corresponding ME 204. Each video preprocessor 201 receives a corresponding video input signal 211 and performs spatial and temporal filtering on the received video input signal 211. Depending on the specific configuration of the video preprocessors 201, the video preprocessors 201 also performs luminance-, chrominance-, and format transformations. The video preprocessors 201 can also collect data for subsequent encoding processes, detect scene changes, detect telecine, perform de-interlacing and other pre-processing functions. Since video preprocessors 201 and their various functions are know to those having skill in the art, as evidenced by the '733 patent (Kaye et al.) and the '658 patent (Uz et al.), further discussion of the video preprocessors 201 is omitted here.

The preprocessed video signal from each of the video preprocessors 201 is conveyed to its corresponding GOP planner 203 and ME 204. The GOP planners 203 receive their corresponding preprocessed video signal. Each GOP planner 203 then generates GOP information from its corresponding preprocessed video signal. As is known by those having skill in the art, as evidenced by the MPEG standard, the GOP information includes a quantity of intra-coded (I) frames, a quantity of predicted (P) frames, and a quantity of bi-directionally-predicted (B) frames for a particular GOP. Additionally, the GOP information includes an order for the I-frames, the P-frames, and the B-frames. In other words, the GOP planners 203 optimize the number and order of the I-, P-, and B-frames for each GOP. Additionally, in accordance with known methods, the GOP planners 203 produce an estimate of the activity (e.g., dynamics of the picture, difficulty of picture encoding, etc.) using statistical information.

Each of the MEs 204 is communicatively coupled to a corresponding GOP planner 203. As such, the MEs 204 receive the GOP information from their corresponding GOP planners 203. The MEs 204 also receive the preprocessed video signals from their corresponding video preprocessors 201. Using the preprocessed video signal and the GOP information, each ME 204 generates motion vectors in accordance with known methods, as taught in the MPEG standard. As is known in the art, as evidenced by the '658 patent (Uz et al.) and the MPEG standard, each ME 204 also splits the frames into macroblocks and performs a first stage of motion estimation (full pel search). Luminance and chrominance frames are then conveyed, either directly or indirectly, from the ME 204 to its corresponding SME 206.

In some embodiments, the SME 206 receives the luminance frames and the chrominance frames directly from its corresponding ME 204, and also receives the GOP information directly from its corresponding GOP planner 203. For those embodiments, the SME 206 performs all calculations without prior optimization of SME encoding.

In other embodiments, a first pass encoder 205 is interposed between the SME 206 and its corresponding GOP planner and ME 204, as shown by the broken lines in FIG. 2. The first pass encoder 205 permits optimization of SME encoding by improving the quality of the encoded video frames and stabilizing the bit-rate. First-pass encoders 205 are described in the '083 patent (Linzer et al), the '396 patent (Adams), the '658 patent (Uz et al.), and the '388 patent (Choi et al.). Since the structure and function of the first pass encoder 205 is described in the above-reference patents and is generally known by those having skill in the art, further discussion of the first-pass encoder 205 is omitted here.

The SME 206 receives, either directly or indirectly, the GOP information from its corresponding GOP planner 203. Additionally, the SME 206 receives, either directly or indirectly, the motion vectors from its corresponding ME 204. Using the GOP information and the motion vector, the SME 206 does half-pel adjustments of motion vector values and generates a plurality of encoded video signals 214a . . . 214n (collectively referred to herein as "encoded video signals 214"). All of the encoded video signals 214 have substantially identical content. However, the encoded video signals 214 each have a different bit-rate. Thus, unlike conventional encoders that produce only one encoded video signal at a single bit-rate, the SME 206 of FIG. 2 generates a number of encoded video signals 214 that have substantially identical content but different bit-rates. In some embodiments, the encoded video signals 214 are generated substantially concurrently. For those embodiments, the SMC 210 generates SME-control signals 215, which provide a timing mechanism by which the SMEs 206 can release the encoded video signals 214 at substantially the same time. In other words, the SMC 210 produces SME-control signals 215, which are conveyed back to the SMEs 206 to indicate that the SMEs 206 can substantially concurrently release the three encoded video signals 214.

Since the SME 206 is discussed in greater detail with reference to FIG. 4, only a truncated discussion of the SME 206 is provided with reference to FIG. 2.

Each SME 206 is communicatively coupled to a corresponding switch 207. In this regard, the encoded video signals 214 from each SME 206 are conveyed to the corresponding switch 207. The encoded video signals 214 from all of the SMEs 206 are also conveyed to the SMC 210. From the received encoded video signals 214, the SMC 210 determines the optimal encoded video signal for each of the SMEs 206. For example, if SME 206a concurrently generates three encoded video signals 214a, each having different bit-rate, then the SMC 210 determines, from the three encoded video signals 214a, which encoded video signal has the optimal bit-rate. The parameters and characteristics of the optimal encoded video signal is described in greater detail with reference to FIG. 5. Upon determining the optimal encoded video signal 218 (i.e., the encoded video signal having the optimal bit-rate), the SMC 210 generates a switch-control signal 216a for that particular SME 206a and conveys the switch-control signal 216a to the appropriate switch 207a. Upon receiving the switch-control signal 216a, the switch 207a selects the optimal encoded video signal 218a and outputs the selected signal 218a to the MUX 208.

In addition to generating the switch-control signals 216, the SMC 210 also generates a multiplexer-control (MUX-control) signal 217 that controls the output of the MUX 208. The MUX-control signal 217 is conveyed from the SMC 210 to the MUX 208. The generation of the MUX-control signal 217 (or equivalent) is known by those having skill in the art, as evidenced by the '733 patent (Kaye et al.), the '658 patent (Uz et al.), the '083 patent (Linzer et al.), and the '388 patent (Choi et al.). Hence, further discussion of the generation of the MUX-control signal 217 is omitted here.

The MUX 208 comprises multiple video inputs that receive the optimal encoded video signals 218a . . . 218n (collectively referred to as "optimal encoded video signals 218") from each of the switches 207. The MUX 208 also comprises an address input that receives the MUX-control signal 217 from the SMC 210. The MUX-control signal 217 controls the output stream of the MUX 208 by selecting one of the optimal encoded video signals 218 for output.

As shown in the embodiment of FIG. 2, by providing SMEs 206, which produce multiple encoded video signals at various bit-rates, and providing switches 207, which select the optimal encoded video signal for their corresponding SMEs 206, greater encoding efficiency can be achieved.

Figure 3:
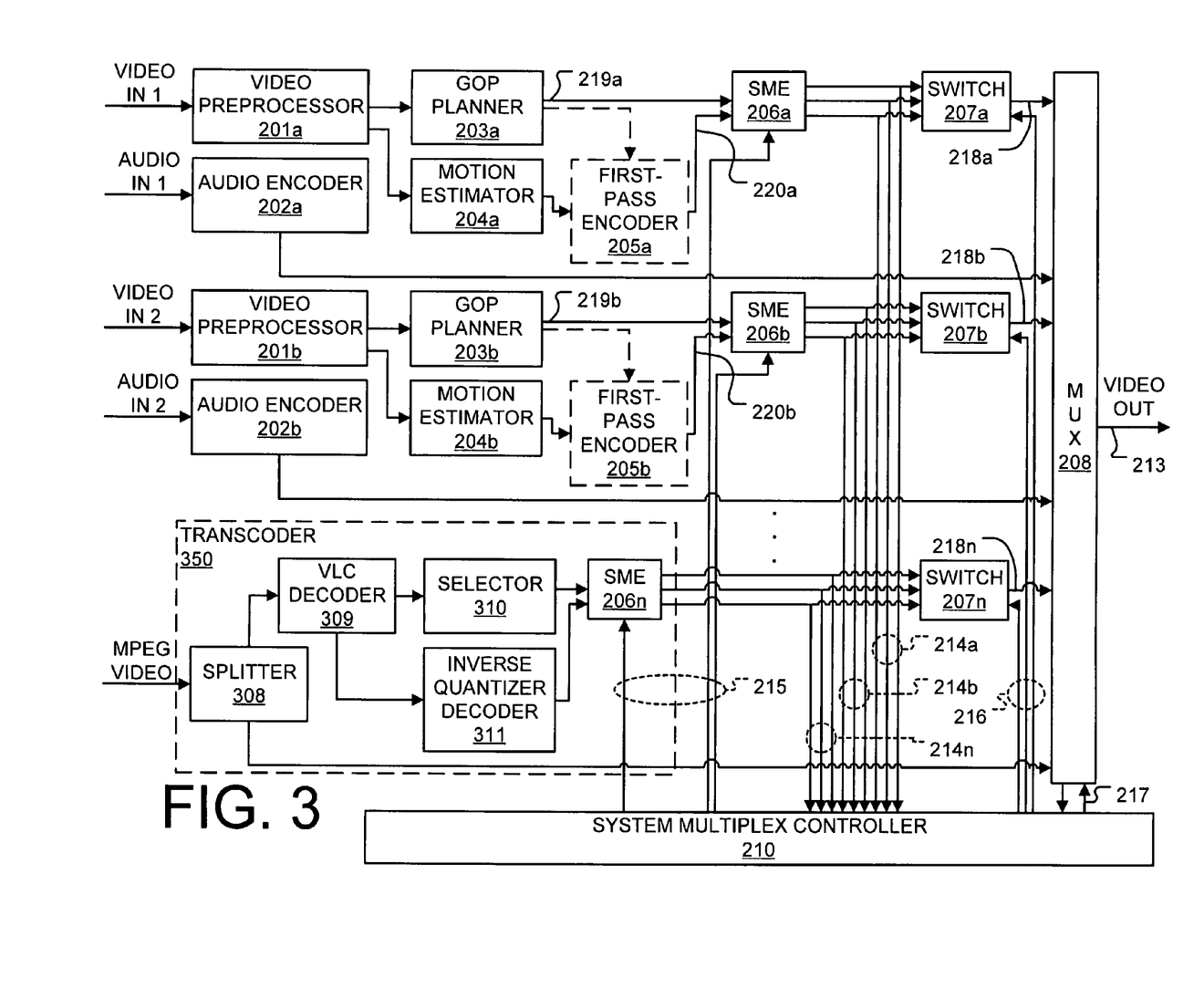
FIG. 3 is a block diagram showing another embodiment of the system, which includes components for transcoding previously-encoded video data streams.

FIG. 3 is a block diagram showing another embodiment of the system, which includes additional components for transcoding an MPEG-compressed video stream from one bit-rate to another. Specifically, the components of a transcoder 350 are shown by the broken lines in FIG. 3. As shown in FIG. 3, the transcoder 350 comprises a splitter 308, a variable-length code (VLC) decoder 309, a selector 310, an inverse quantization decoder 311, and an SME 206. As shown in FIG. 3, an MPEG video stream (or, simply, MPEG stream) is input to the splitter 308. The splitter 308 separates the MPEG stream into its audio component and video component. The audio component is conveyed directly to the MUX 208, while the video component is conveyed to the VLC decoder 309. VLC decoder 309 decodes and separates data, which is in the input data stream. The decoding and separating of data is performed in compliance with appropriate video coding standards, which are known to those having skill in the art. The unmodified data, such as, for example, headers and motion vector components, are conveyed to the SME 206. Other modifiable data, such as, for example, DCT components, are conveyed through the inverse quantizer decoder 311. Reconstructed values are conveyed to the SME 206 accordingly.

Since the video preprocessors 201, the audio encoders 202, the GOP planners 203, the motion estimators 204, the first-pass encoders 205, the SMEs 206, the switches 207, the MUX 208, and the SMC 210 are described with reference to FIG. 2, further discussion of those components is omitted here.

Figure 4:
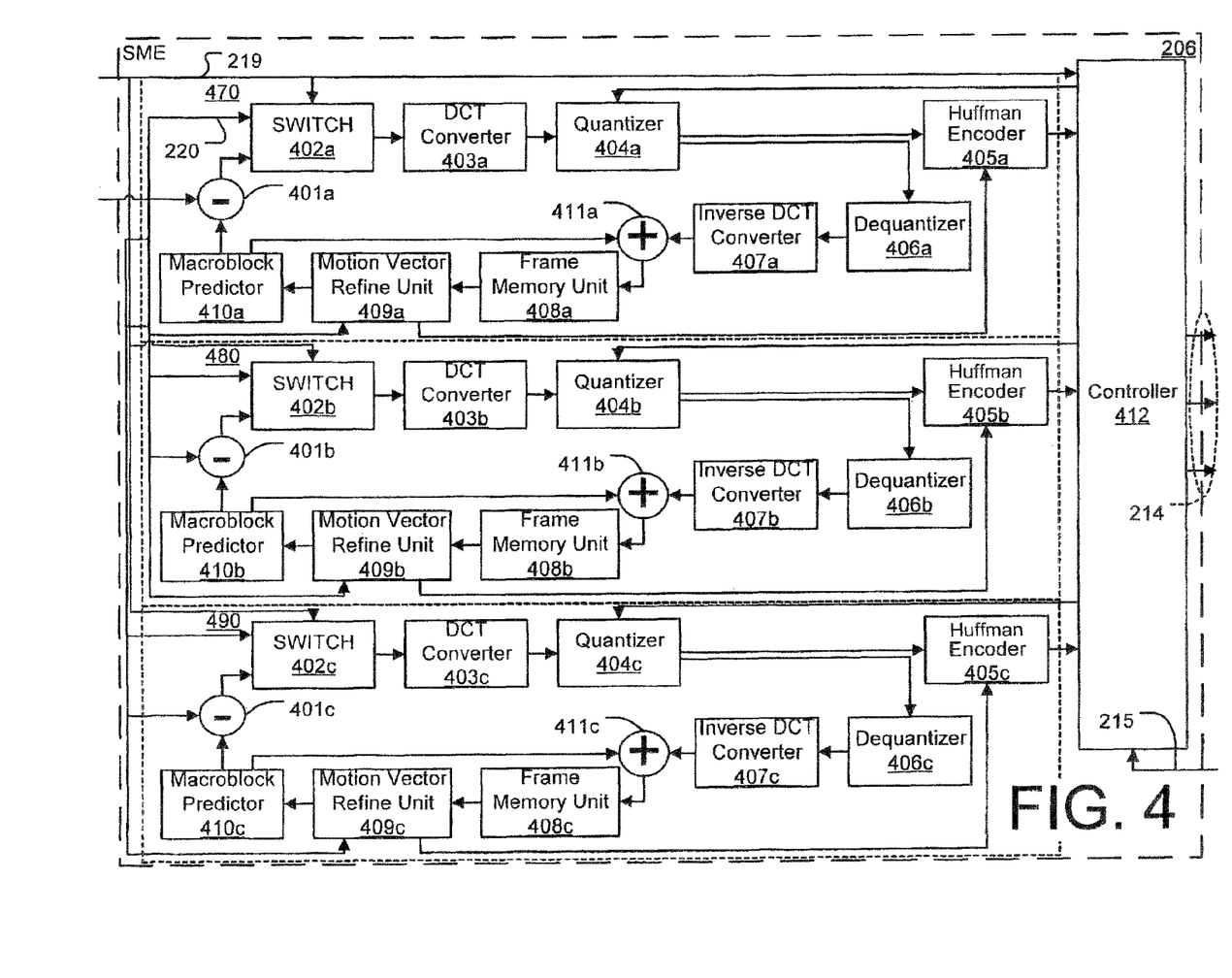
FIG. 4 is a block diagram showing an embodiment of the synchronous multi-channel encoder (SME) of FIG. 2.

FIG. 4 is a block diagram showing an embodiment of the synchronous multi-channel encoder (SME) 206 of FIG. 2. As shown in FIG. 4, an embodiment of the SME 206 comprises three parallel data paths 470, 480, 490. Each of the parallel data paths 470, 480, 490 produces an encoded video signal with substantially the same information but with different bit-rates. Hence, the first data path 470 produces a first encoded video signal with a given bit-rate. The second data path 480 produces a second encoded video signal, which has substantially the same information as the first encoded video signal but with a different bit-rate. The third data path 490 produces a third encoded video signal, which has substantially the same information as the first and second encoded video signals, but with a different bit-rate from the first and second encoded video signals.

The three encoded video signals are conveyed to a controller 412, which receives the three encoded video signals from each of the data paths 470, 480, 490, and outputs the encoded video signals 214 at substantially the same time. Thus, the controller 412 concurrently produces three encoded video signals 214, each having a different bit-rate than the other two encoded video signals. The controller 412 is controlled by the SME-control signal 215, as described above.

Since the components in each of the data paths 470, 480, 490 perform similar functions, only the components of the first data path 470 are discussed below.

The first data path 470 comprises a subtractor 401a, a switch 402a, a discrete cosine transform (DCT) converter 403a, a quantizer 404a, a Hoffman encoder 405a, a dequantizer 406a, an inverse DCT (IDCT) converter 407a, a frame memory unit 408a, a motion vector refine unit 409a, a macroblock predictor 410a, and an adder 411a. The switch 402a has three input nodes: two data inputs (one for inter-coding and another for intra-coding) and one selector input.

In operation, the motion vector from the motion estimator 204 is input to the intra-coding data input of the switch 402a and, also, the subtractor 401a. The subtractor 401 subtracts the motion vector from the output of the macroblock predictor 410. The macroblock predictor 410 is described below.

The subtracted result is input to the inter-coding data input of the switch 402a. The GOP information from the GOP planner 203 is input to the selector input of the switch 402a and, also, to the controller 412. The controller 412 receives the GOP information and uses that information to form video bit streams in accordance with known methods.

The switch 402a, depending on the input to its selector input node, sets its input position to either the intra-coding position or the inter-coding position. In this regard, the switch 402a effectively selects either the subtracted result or the motion vector from the motion estimator 204. The selected data is conveyed to the DCT converter 403a.

The DCT converter 403a receives the data from the switch 402a and performs a digital cosine transform on that data. The digital cosine transformed data (DCT-data) is then conveyed to the quantizer 404a.

The quantizer 404a receives the DCT-data and, also, receives a control signal from the controller 412. The control signal from the controller 412 supervises the performance of the quantizer 404a. In response to receiving the control signal and the DCT-data, the quantizer 404a produces quantized coefficients. The quantized coefficients are conveyed to the Huffman encoder 405a and the dequantizer 406a.

The Huffman encoder 405a receives the quantized coefficients from the quantizer 404a and, also, receives the motion vector values from the motion vector refine unit 409a. The motion vector refine unit 409a is described below. Given the motion vector values and the quantized coefficients, the Huffman encoder 405a performs variable-length coding (VLC) to produce an encoded video signal. Since the operation of Huffman encoders 405a are known in the art, further discussion of Huffman encoders 405a is omitted here. The encoded video signal is conveyed to the controller 412. The controller 412 receives the encoded video signal and, upon receiving the SME-control signal 215, releases the encoded video signal along with the other encoded video signals 214 from the other parallel data paths 480, 490.

The dequantizer 406a restores the scale of the DCT-data from the quantized coefficients, which are received from the quantizer 404a. The restored scale information is conveyed to the IDCT converter 407a.

The IDCT converter 407a restores the video frames from the restored scale information. The restored video frames are conveyed to the adder 411a.

The adder 411a receives the restored video frames and, also, receives reference macroblock pixel values from the macroblock predictor 410a. The macroblock predictor 410 is described in greater detail below. From the restored video frames and the reference macroblock pixel values, the adder 411a restores full pixel values. The full pixel values are conveyed to the frame memory unit 408a.

The frame memory unit 408a receives the full pixel values from the adder 411a and stores that information. The full frame memory unit 408a also conveys the full pixel values to the motion vector refine unit 409a.

The motion vector refine unit 409a has two inputs. One input is coupled to the output of the frame memory unit 408a and receives the full pixel values from the frame memory unit 408a. The other input receives the motion vector from the motion estimator 204. Upon receiving the motion vector and the full pixel values, the motion vector refine unit 409a performs a half-pel precision motion estimation in accordance with known methods. The results of the half-pel precision motion estimation are conveyed to both the subtractor 401a and, also, to the adder 411a.

As shown in FIG. 4, each data path 470, 480, 490 comprises multiple feedback pathways that are configured to eventually produce an encoded video signal in accordance with known methods. However, unlike conventional approaches, which produce a single encoded video signal, the parallel data paths 470, 480, 490 produce multiple encoded video signals 214, each of which has a different bit-rate. Thus, unlike conventional approaches, the optimal encoded video signal can be selected, as shown in FIG. 2, thereby improving performance.

Currently, Intel® Corporation produces a "Prescott" (Pentium® 4) processor that operates at a frequency of approximately 4 GHz. The Prescott processor is capable of performing 128-bit calculations, has a very high-speed system bus, and has about 1 MB of inner-memory cache. The Prescott processor (or equivalent processor) accommodates hyper-threading technology that makes a single physical processor appear as multiple logical processors by running two threads substantially simultaneously. Since hyperthreading is known in the art, further discussion of hyperthreading is omitted here. These and other characteristics of the Prescott processor permit synchronized receiving of more than one encoded MPEG video stream from the each video channel, thereby improving processing efficiency. Embodiments of systems and methods utilizing such improved processing efficiency have been described above.

Figure 5:
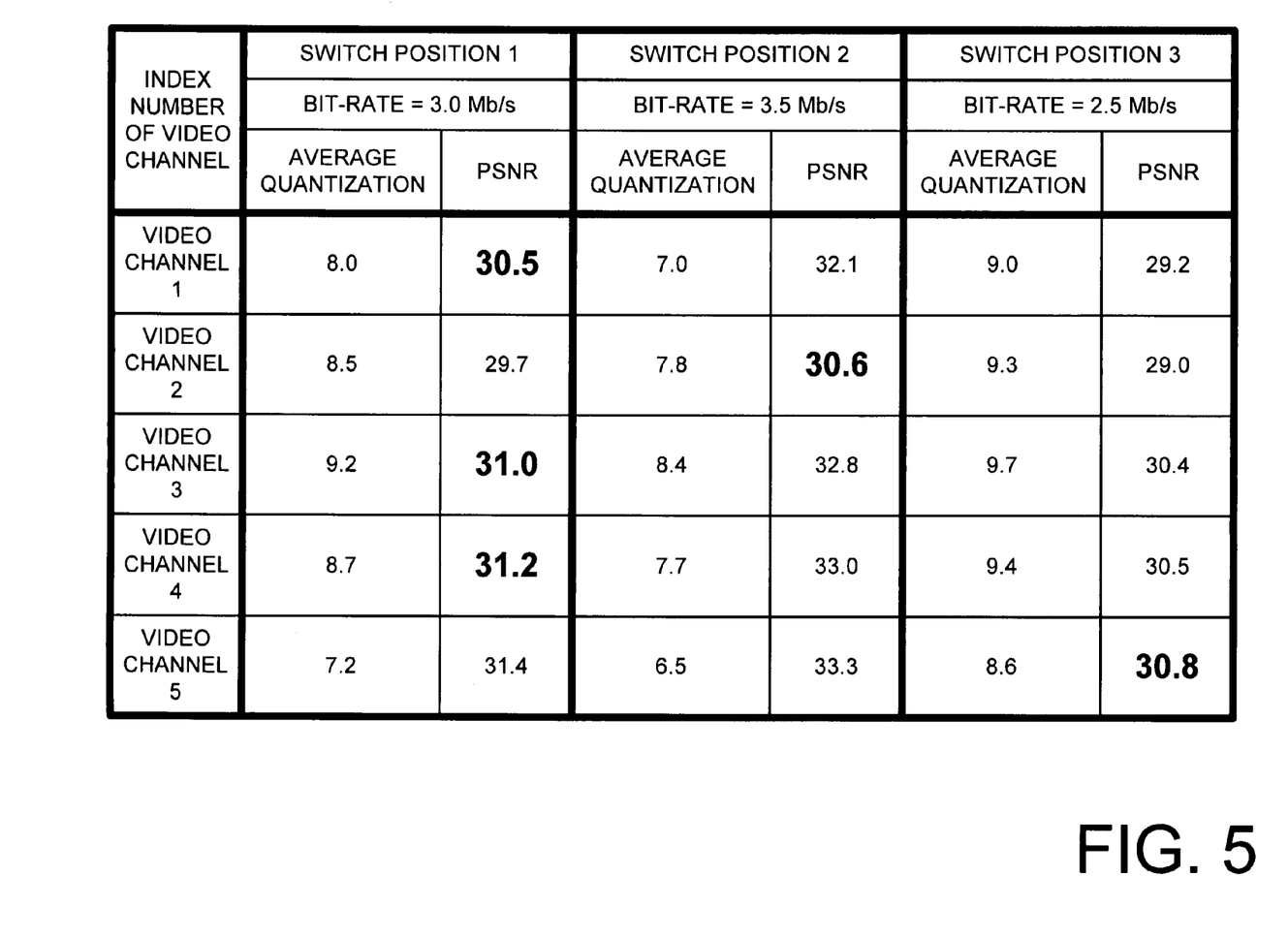
FIG. 5 is a table illustrating an example performance of a five-input, three-switch-position SME 206.

FIG. 5 is a table illustrating an example performance of a five-input, three-switch-position SME 206. As shown in the table of FIG. 5, five video channels are presented, in which each video channel has three switch positions. As such, there is a total of 3*3*3*3*3, or 243, possible combinations. For modern processors, the computation of 243 combinations takes less than approximately 100 µs. The SMC 210, as described above, obtains the values of average quantize coefficients and average quality index for each of the SMEs 206. One measure, among others, of the quality index is a calculation of a peak signal-to-noise ratio (PSNR), which is defined by:

$$PSNR = 10 \log((255*255)/MSE) \qquad [\text{Eq. 1}],$$

where MSE represents the mean-square error. For the embodiments that use PSNR, the optimal performance is determined as the smallest PSNR value among all channels without of exceeding the ordered limit. This criteria is known in the mathematical literature as a maximin optimization criteria.

In the example of FIG. 5, each switch position correlates to a different bit-rate. For example, the first switch position may correlate to a bit-rate of 3.0 Mb/s; the second switch position may correlate to a bit-rate of 3.5 Mb/s; and the third switch position may correlate to a bit-rate of 2.5 Mb/s. Thus, for each video channel, three possible PSNRs are calculated; one for each switch position.

The first switch of the first video channel correlates to a PSNR of 30.5; the second switch of the first video channel correlates to a PSNR of 32.1; and the third switch of the first video channel correlates to a PSNR of 29.2. The first switch of the second video channel correlates to a PSNR of 29.7; the second switch of the second video channel correlates to a PSNR of 30.6; and the third switch of the second video channel correlates to a PSNR of 29.0. The first switch of the third video channel correlates to a PSNR of 31.0; the second switch of the third video channel correlates to a PSNR of 32.8; and the third switch of the third video channel correlates to a PSNR of 20.4. The first switch of the fourth video channel correlates to a PSNR of 31.2; the second switch of the fourth video channel correlates to a PSNR of 33.0; and the third switch of the fourth video channel correlates to a PSNR of 30.5. The first switch of the fifth video channel correlates to a PSNR of 31.4; the second switch of the fifth video channel correlates to a PSNR of 33.3; and the third switch of the fifth video channel correlates to a PSNR of 30.8.

If the maximum limit of the combined output rate is 15.0 Mb/s, then the optimal switch positions for each of the video channels would be: the first switch position (PSNR=30.5) for the first video channel; the second switch position (PSNR=30.6) for the second video channel; the first switch position (PSNR=31.0) for the third video channel; the first switch position (PSNR=31.2) for the fourth video channel; and the third switch position (PSNR=30.8) for the fifth video channel. The SMC 210, upon calculating the optimal switch positions, provides the information to the switches 207, as described above. Thus, an optimal encoded video signal is provided for each of the video channels.

The systems and methods described above result in improved performance because the SMC combines streams with low latency. The reason being that two or more encoded video signals are provided substantially concurrently by each SME 206, thereby permitting switching from one encoded video signal to another within any given computing cycle.

The video preprocessors 201, the audio encoders 202, the GOP planners 203, the motion estimators 204, the first-pass encoders 205, the SMEs 206, the switches 207, 402, the MUX 208, the SMC 210, the VLC decoder 309, the selector 310, the inverse quantizer decoder 311, the DCT converters 403, the quantizers 404, the Huffman encoders 405, the dequantizers 406, the IDCT converters 407, the frame memory units 408, the motion vector refine units 409, the macroblock predictors 410, the subtractors 401, the adders 411, and the controller 412 may be implemented in hardware, software, firmware, or a combination thereof. In the preferred embodiment(s), the video preprocessors 201, the audio encoders 202, the GOP planners 203, the motion estimators 204, the first-pass encoders 205, the SMEs 206, the switches 207, 402, the MUX 208, the SMC 210, the VLC decoder 309, the selector 310, the inverse quantizer decoder 311, the DCT converters 403, the quantizers 404, the Huffman encoders 405, the dequantizers 406, the IDCT converters 407, the frame memory units 408, the motion vector refine units 409, the macroblock predictors 410, the subtractors 401, the adders 411, and the controller 412 are implemented in software or firmware that is stored in a memory and that is executed by a suitable instruction execution system. If implemented in hardware, as in an alternative embodiment, the video preprocessors 201, the audio encoders 202, the GOP planners 203, the motion estimators 204, the first-pass encoders 205, the SMEs 206, the switches 207, 402, the MUX 208, the SMC 210, the VLC decoder 309, the selector 310, the inverse quantizer decoder 311, the DCT converters 403, the quantizers 404, the Huffman encoders 405, the dequantizers 406, the IDCT converters 407, the frame memory units 408, the motion vector refine units 409, the macroblock predictors 410, the subtractors 401, the adders 411, and the controller 412 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Although exemplary embodiments have been shown and described, it will be clear to those of ordinary skill in the art that a number of changes, modifications, or alterations to the invention as described may be made. All such changes, modifications, and alterations should therefore be seen as within the scope of the disclosure.

What is claimed is:

1. An apparatus, comprising:
  a processing device configured to:
    encode a first scalable media bit stream more than once, each such encoding using distinct encoding parameters, to generate a plurality of encoded instances of the first scalable media bit stream, the first stream encoded instances having different bit rates;

encode a second scalable media bit stream more than once, each such encoding using distinct encoding parameters, to generate a plurality of encoded instances of the second scalable media bit stream, the second stream encoded instances having different bit rates;

encode a third scalable media bit stream more than once, each such encoding using distinct encoding parameters, to generate a plurality of encoded instances of the third scalable media bit stream, the third stream encoded instances having different bit rates;

select one of the first stream encoded instances to be transmitted from the apparatus over a network, wherein the selection of the first stream encoded instance is based at least in part on an analysis of quality indices of the second stream encoded instances and quality indices of the third stream encoded instances;

select one of the second stream encoded instances to be transmitted from the apparatus over the network, wherein the selection of the second stream encoded instance is based at least in part on an analysis of quality indices of the first stream encoded instances and the quality indices of the third stream encoded instances;

select one of the third stream encoded instances to be transmitted from the apparatus over the network, wherein the selection of the third stream encoded instance is based at least in part on an analysis of the quality indices of the first stream encoded instances and the quality indices of the second stream encoded instances; and multiplex the selected ones of the first and second stream encoded instances for transmission over a same channel.

2. The apparatus of claim 1, wherein the transmission is a multicast or broadcast transmission of the selected encoded instances.

3. The apparatus of claim 1, further comprising:

an encoder configured to receive data representing the first scalable media bit stream, the encoder further being configured to encode the plurality of instances of the first scalable media bit stream;

a plurality of redundant data paths contained within the encoder, the plurality of redundant data paths equal in number to a quantity of the first stream encoded instances, each of the redundant data paths having a plurality of encoding components that matches a corresponding plurality of encoding components of another one of the redundant data paths, each of the different redundant data paths to encode a different corresponding one of the first stream encoded instances in parallel with encoding of another one of the first stream encoded instances by another one of the redundant data paths; and a switch coupled to the encoder, the switch being configured to receive the first stream encoded instances, the switch further being configured to pass the selected first stream encoded instance.

4. The apparatus of claim 3, further comprising:

a timing component to send a timing control signal to the encoder;

wherein the encoder is configured to observe the timing control signal, and to conduct a synchronized release of the first stream encoded instances to the switch in accordance with the observed timing control signal.

5. The apparatus of claim 4, wherein the synchronized release by the encoder causes the first stream encoded instances to be received by the switch at the same time independently of whether one of the redundant data paths completes encoding of its corresponding first stream instance earlier than another one of the redundant data paths completes its encoding of its corresponding first stream instance.

6. The apparatus of claim 3, further comprising:

a picture ordering planner configured to generate frame sequence information based on a received signal, the picture ordering planner to output the generated frame sequence information to be encoded by the encoder;

wherein the data received by the encoder includes the frame sequence information generated by the picture ordering planner, and the encoder is configured to encode the first scalable media bit stream based on the generated frame sequence information.

7. The apparatus of claim 1, wherein the selection of the first stream encoded instance is based at least in part on an analysis of Peak Signal to Noise Ratios (PSNR) values of the second and third stream encoded instances, wherein the selection of the second stream encoded instance is based at least in part on an analysis of PSNR values of the first and third stream encoded instances, and wherein the selection of the third stream encoded instance is based at least in part on an analysis of PSNR values of the first and second stream encoded instances.

8. The apparatus of claim 1, wherein the processing device is configured to:

identify a capacity of the channel;

calculate a signal to noise ratio for each encoded instance of the first stream, for each encoded instance of the second stream, and for each encoded instance of the third stream;

generate a plurality of distinct combinations of the signal to noise ratios, wherein each distinct combination includes one of the signal to noise ratios that corresponds to a particular one of the first stream encoded instances, one of the signal to noise ratios that corresponds to a particular one of the second stream encoded instances, and one of the signal to noise ratios that corresponds to a particular one of the third stream encoded instances, wherein the generated plurality of distinct combinations includes at least six distinct combinations; and analyze the generated plurality to identify a particular one of the combinations that has optimal signal to noise ratios without a summation of corresponding encoded instances exceeding the identified capacity of the channel, wherein the analysis is performed using a maximin optimization criteria;

wherein the selections are based on the analysis.

9. The apparatus of claim 1, wherein the first, second, and third scalable media bit streams include video information.

10. An apparatus, comprising:

a processing device configured to encode a first scalable media bitstream more than once, a second scalable media bit stream more than once, and a third scalable media bit stream more than once, each of the encodings of the first scalable media bit stream using distinct encoding parameters, each of the encodings of the second scalable media bit stream using distinct encoding parameters, and each of the encodings of the third scalable media bit stream using distinct encoding parameters, the encodings generating a plurality of encoded instances of the first scalable media bit stream, a plurality of encoded instances of the second scalable media bit stream, and a plurality of encoded instances of the third scalable media bit stream, wherein the first stream encoded instances have different bit rates, the second stream encoded instances have different bit rates, and the third stream encoded instances have different bit rates;

means for identifying a subset of the first stream encoded instances based at least in part on a quality analysis of the second stream encoded instances and a quality analysis of the third stream encoded instances, identifying a subset of the second stream encoded instances based at least in part on a quality analysis of the first stream encoded instances and the quality analysis of the third stream encoded instances, and identify a subset of the third stream encoded instances based at least in part on the quality analysis of the first stream encoded instances and the quality analysis of the second stream encoded instances; and means for controlling which ones of the encoded instances are passed to a multiplexing transmission component according to the identification of the subsets.

11. The apparatus of claim 10, further comprising:
means for calculating signal to noise ratios for each of the encoded instances; and
means for identifying the subset of the first stream encoded instances based at least in part on the calculated signal to noise ratios of the second stream encoded instances and the calculated signal to noise ratios of the third stream encoded instances, identifying the subset of the second stream encoded instances based at least in part on the calculated signal to noise ratios of the first stream encoded instances and the calculated signal to noise ratios of the third stream encoded instances, and identifying the subset of the third stream encoded instances based at least in part on the calculated signal to noise ratios of the first stream encoded instances and the calculated signal to noise ratios of the second stream encoded instances.

12. The apparatus of claim 10, further comprising means for identifying the subset of the first stream encoded instances based at least in part on an analysis of Peak Signal to Noise Ratios (PSNR) values of the second and third stream encoded instances, identifying the subset of the second stream encoded instances based at least in part on an analysis of PSNR values of the first and third stream encoded instances, and identifying the subset of the third stream encoded instances based at least in part on an analysis of PSNR values of the first and second stream encoded instances.

13. The apparatus of claim 10, further comprising:
means for calculating a signal to noise ratio for each encoded instance of the first stream, for each encoded instance of the second stream, and for each encoded instance of the third stream;
means for generating a plurality of distinct combinations of the signal to noise ratios, wherein each distinct combination includes one of the signal to noise ratios that corresponds to a particular one of the first stream encoded instances, one of the signal to noise ratios that corresponds to a particular one of the second stream encoded instances, and one of the signal to noise ratios that corresponds to a particular one of the third stream encoded instances, wherein the generated plurality of distinct combinations includes at least six distinct combinations; and
means for analyzing the generated plurality to identify a particular one of the combinations that has optimal signal to noise ratios without a summation of corresponding encoded instances exceeding a capacity of a constrained bit rate channel, wherein the analysis is performed using a maximin optimization criteria;
wherein the selections are based on the analysis.

14. The apparatus of claim 10, wherein the first, second, and third scalable media bit streams include video information.

15. A method, comprising:
encoding, using a network device, a first scalable media bit stream more than once, a second scalable media bit stream more than once, and a third scalable media bit stream more than once, each of the encodings of the first scalable media bit stream using distinct encoding parameters, each of the encodings of the second scalable media bit stream using distinct encoding parameters, and each of the encodings of the third scalable media bit stream using distinct encoding parameters, the encodings generating a plurality of encoded instances of the first scalable media bit stream, a plurality of encoded instances of the second scalable media bit stream, and a plurality of encoded instances of the third scalable media bit stream, wherein the first stream encoded instances have different bit rates, the second stream encoded instances have different bit rates, and the third stream encoded instances have different bit rates;
identifying, using the network device, a subset of the first stream encoded instances based at least in part on a quality analysis of the second stream encoded instances and a quality analysis of the third stream encoded instances, identifying a subset of the second stream encoded instances based at least in part on a quality analysis of the first stream encoded instances and the quality analysis of the third stream encoded instances, and identifying a subset of the third stream encoded instances based at least in part on the quality analysis of the first stream encoded instances and the quality analysis of the second stream encoded instances; and
controlling, using the network device, which ones of the encoded instances are passed to a multiplexing transmission processor according to the identification of the subsets.

16. The method of claim 15, further comprising:
identifying a capacity of a constrained bit rate channel;
calculating signal to noise ratios for the encoded instances; and
identifying the subset of the first stream encoded instances based at least in part on a comparison of the calculated signal to noise ratios of the second and third stream encoded instances to the identified capacity, identifying the subset of the second stream encoded instances based at least in part on a comparison of the calculated signal to noise ratios of the first and third stream encoded instances to the identified capacity, and identifying the subset of the third stream encoded instances based at least in part on a comparison of the calculated signal to noise ratios of the first and second stream encoded instances to the identified capacity.

17. The method of claim 16, further comprising:
re-calculating signal to noise ratios for the encoded instances;
selecting a new subset of the first stream encoded instances according to the re-calculated signal to noise ratios; and
dynamically varying transmission from the previously selected subset of the first stream encoded instances to the newly selected subset of the first stream encoded instances responsive to the new selection.

18. The method of claim 17, wherein the previously selected subset and the newly selected subset are addressed to a same decoder such that the dynamic varying of the transmission causes the decoder to dynamically switch between decoding the different subsets of the first stream encoded instances.

19. The method of claim 17, further comprising dynamically varying transmission over the constrained bit rate channel.

20. The method of claim 15, wherein the network device is configured to identify the subset of the first stream encoded instances based at least in part on an analysis of Peak Signal to Noise Ratios (PSNR) values of the second and third stream encoded instances, to identify the subset of the second stream encoded instances based at least in part on an analysis of PSNR values of the first and third stream encoded instances, and to identify the subset of the third stream encoded instances based at least in part on an analysis of PSNR values of the first and second stream encoded instances.

21. The method of claim 15, further comprising:
identifying a capacity of a constrained bit rate channel;
calculating a signal to noise ratio for each encoded instance of the first stream, for each encoded instance of the second stream, and for each encoded instance of the third stream;
generating a plurality of distinct combinations of the signal to noise ratios, wherein each distinct combination includes one of the signal to noise ratios that corresponds to a particular one of the first stream encoded instances, one of the signal to noise ratios that corresponds to a particular one of the second stream encoded instances, and one of the signal to noise ratios that corresponds to a particular one of the third stream encoded instances, wherein the generated plurality of distinct combinations includes at least six distinct combinations; and analyzing the generated plurality to identify a particular one of the combinations that has optimal signal to noise ratios without a summation of corresponding encoded instances exceeding the identified capacity of the constrained bit rate channel, wherein the analysis is performed using a maximin optimization criteria;
wherein the selections are based on the analysis.

22. The method of claim 15, wherein the first, second, and third scalable media bit streams include video information.

23. The method of claim 22, further comprising differently encoding the first stream encoded instances by varying motion vector values between the first stream encoded instances.

* * * * *

UNITED STATES PATENT AND TRADEMARK OFFICE
CERTIFICATE OF CORRECTION

PATENT NO. : 7,898,951 B2
APPLICATION NO. : 10/913864
DATED : March 1, 2011
INVENTOR(S) : Koba et al.

It is certified that error appears in the above-identified patent and that said Letters Patent is hereby corrected as shown below:

Title page, item (57), under "Abstract", in Column 2, Line 15, delete "and than" and insert -- and then --.

Page 2, item (56), under "Other Publications", in Column 2, Line 2, delete "Deveolopment," and insert -- Development, --.

Column 12, line 54, in Claim 10, delete "bitstream" and insert -- bit stream --.

Signed and Sealed this
Thirty-first Day of May, 2011

David J. Kappos
*Director of the United States Patent and Trademark Office*